No. 777,572. Patented December 13, 1904.

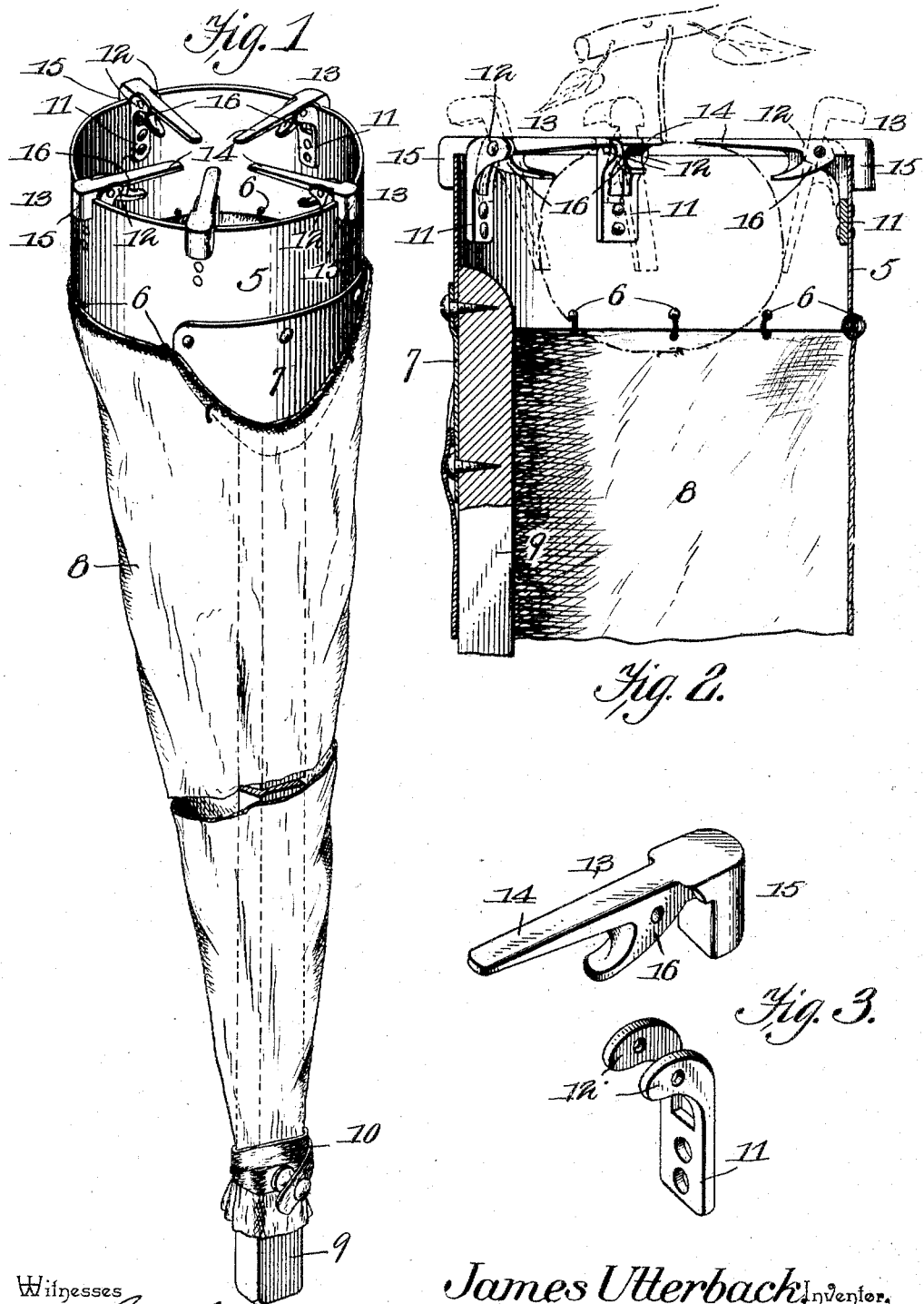

UNITED STATES PATENT OFFICE.

JAMES UTTERBACK, OF HONEOYE FALLS, NEW YORK.

FRUIT-PICKER.

SPECIFICATION forming part of Letters Patent No. 777,572, dated December 13, 1904.

Application filed November 19, 1903. Serial No. 181,888. (No model.)

*To all whom it may concern:*

Be it known that I, JAMES UTTERBACK, a citizen of the United States, residing at Honeoye Falls, in the county of Monroe and State of New York, have invented a new and useful Fruit-Picker for Picking Fruit, such as Apples and Peaches, from the Tree, of which the followng is a specification.

This invention relates to an improved fruit-picker, and has for its object the production of a simple, efficient, and inexpensive device of this character by means of which various kinds of fruit may be quickly and readily plucked or detached from the tree and deposited in a suitable receptacle without bruising or otherwise injuring the fruit.

A further object of the invention is to provide the receiver with a plurality of fingers yieldable but in one direction to thereby permit said fingers to embrace the fruit when the picker is forced upwardly and to sever or detach the fruit from the tree when a downward pull is exerted thereon.

A still further object is to arrange the fruit-engaging fingers in such a manner that they will act independently of each other, thus permitting the operation of the picker at any angle or from any position which will enable the operator to embrace the fruit within the receiver.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a perspective view of a fruit-picker constructed in accordance with my invention. Fig. 2 is a longitudinal sectional view showing in dotted lines the position of the fingers as the fruit passes into the containing-receptacle. Fig. 3 is a detail perspective view of one of the fingers and its supporting-bracket detached.

Similar numerals of reference indicate corresponding parts in all the figures of the drawings.

In constructing the picker I employ a supporting frame or receiver 5, preferably circular in shape, as shown, and formed of metal or other suitable material, said frame being provided at its lower end with a series of openings or perforations 6 and having a substantially triangular-shaped reinforcing-plate 7 riveted or otherwise secured thereto. Fastened to the bottom of the circular frame 5 is a fruit-containing receptacle 8, preferably in the form of a flexible bag, the upper end of which is secured to the frame by means of cords or similar fastening devices, which pass through the perforation 6 and engage said bag, as shown. An operating-handle 9 is secured in any suitable manner to the inner side of the triangular plate 7 and extends within the bag 8, a strap 10 being secured to the lower end of said handle for closing the bottom of the bag when picking the fruit.

Rigidly secured to the inner periphery of the supporting-ring 5 are a series of brackets 11, provided with outwardly-projecting spaced lugs 12, between which are pivoted in any suitable manner a plurality of horizontally-disposed radiating fingers 13. The long ends 14 of the fingers 13 extend inwardly over the mouth of the receiver and fill the top of the frame sufficiently to prevent the fruit passing between said fingers after they have closed over the fruit, while the short weighted end 15 of each finger rests upon the top of the frame, projecting over and below the outer edge thereof, so as to form a rigid knuckle, and thereby hold said fingers firmly in a horizontal position.

The fingers 13 are provided with depending lugs or projections 16, which engage the brackets 11 and limit the downward movement of the fingers and prevent said fingers from tipping downwardly to a point where they would overbalance and fail to return to their normal position after engaging the fruit.

The fingers 13 being independently pivoted to the supporting-frame, as shown, permit the operation of the picker at any angle or from any position below the tree, which enables the operator to embrace the fruit within said frame.

In practice the picker is held in position under the fruit and raised to allow the fruit to press upon and tip the fingers sufficiently to admit the fruit into the frame, said fingers automatically returning to their normal position by gravity. The fingers thus embrace the fruit and hold it within the frame, in which position the fruit may be readily detached or severed from the limb of the tree by exerting a slight downward pull on the operating-handle. The fruit thus detached falls through the frame into the bag or other receptacle, from which it may be removed when desired by releasing the securing-strap, as will be readily understood.

Having thus described the invention, what is claimed is—

1. In a device of the class described, a receiver, a plurality of fingers pivoted to the receiver and yieldable downwardly within the same, and means for returning said fingers to operative position.

2. In a device of the class described, a receiver having a plurality of independently-mounted fruit-engaging members yieldable downwardly within the receptacle, and means for returning said members to operative position.

3. In a device of the class described, a receiver having a plurality of radially-disposed fingers pivoted thereto and yieldable downwardly within the same, and means for returning said fingers to operative position.

4. In a device of the class described, a receiver having an open top, and a plurality of self-adjusting fruit-engaging fingers pivoted thereto and serving to normally close the top of said receiver.

5. In a device of the class described, a receiver having a plurality of horizontally-disposed fruit-engaging fingers pivoted thereto and yieldable downwardly within the receiver, and means for returning said fingers to operative position.

6. In a device of the class described, a receiver having an open top, and a plurality of weighted fruit-engaging fingers pivoted thereto and yieldable downwardly within the receiver, said fingers being normally held in a horizontal plane.

7. In a device of the class described, a receiver having an open top, a plurality of normally horizontal fruit-engaging fingers pivoted thereto, and means for limiting the downward movement of said fingers.

8. In a device of the class described, a receiver having a plurality of horizontally-disposed fruit-engaging fingers pivoted thereto and yieldable downwardly within the receptacle, means for limiting the downward movement of the fingers, and means for automatically returning said fingers to operative position.

9. In a device of the class described, a receiver having a plurality of normally horizontal radiating fingers pivoted thereto and yieldable downwardly within the receiver, and means carried by said fingers for limiting the downward movement thereof.

10. In a device of the class described, a receiver having a plurality of horizontally-disposed fingers pivoted thereto and extending over the mouth of the receiver, said fingers being provided with weighted end portions.

11. In a device of the class described, a receiver, and a plurality of fruit-engaging fingers pivoted thereto, one end of each finger being weighted and provided with a depending lug.

12. In a device of the class described, a receiver having a plurality of radially-disposed independently-pivoted fingers yieldable downwardly within the receiver and terminating short of the center of the latter, said fingers being normally held in a horizontal plane.

In witness whereof I have signed my name to this specification in the presence of two subscribing witnesses.

JAMES UTTERBACK.

Witnesses:
L. RAY STOKOE,
GEORGE DRUSCHEL.